(12) United States Patent
Askan

(10) Patent No.: US 11,195,675 B2
(45) Date of Patent: Dec. 7, 2021

(54) LOW-VOLTAGE CIRCUIT BREAKER DEVICE

(71) Applicant: Eaton Intelligent Power Limited, Dublin (IE)

(72) Inventor: Kenan Askan, Vienna (AT)

(73) Assignee: EATON INTELLIGENT POWER LIMITED, Dublin (IE)

( * ) Notice: Subject to any disclaimer, the term of this patent is extended or adjusted under 35 U.S.C. 154(b) by 164 days.

(21) Appl. No.: 16/342,989

(22) PCT Filed: Sep. 29, 2017

(86) PCT No.: PCT/EP2017/074910
§ 371 (c)(1),
(2) Date: Apr. 18, 2019

(87) PCT Pub. No.: WO2018/072983
PCT Pub. Date: Apr. 26, 2018

(65) Prior Publication Data
US 2020/0058454 A1 Feb. 20, 2020

(30) Foreign Application Priority Data

Oct. 21, 2016 (DE) ..................... 10 2016 120 070.0

(51) Int. Cl.
*H02H 3/02* (2006.01)
*H01H 9/54* (2006.01)
(Continued)

(52) U.S. Cl.
CPC ............ *H01H 9/542* (2013.01); *H01H 9/548* (2013.01); *H02H 3/025* (2013.01); *H02H 3/08* (2013.01);
(Continued)

(58) Field of Classification Search
CPC ............ H02H 3/08; H02H 3/24; H02H 3/243; H02H 3/087; H02H 1/0007; H04L 12/4625; H04L 12/40006
See application file for complete search history.

(56) References Cited

U.S. PATENT DOCUMENTS 9,634,476 B1 4/2017 Cao et al.
2011/0063759 A1* 3/2011 Billingsley ............... H01H 9/56
361/1

(Continued)

FOREIGN PATENT DOCUMENTS

| EP | 2523204 A1 | 11/2012 |
| EP | 3010030 A1 | 4/2016 |
| WO | 2015028634 A1 | 3/2015 |

*Primary Examiner* — Bryan R Perez
(74) *Attorney, Agent, or Firm* — Leydig, Voit & Mayer, Ltd.

(57) ABSTRACT

A low-voltage protective switching device includes: at least one outer conductor path from an outer conductor supply terminal of the low-voltage protective switching device to an outer conductor load terminal of the low-voltage protective switching device; a neutral conductor path from a neutral conductor terminal of the low-voltage protective switching device to a neutral conductor load terminal of the low-voltage protective switching device; a mechanical bypass switch disposed in the outer conductor path; a first semiconductor circuit arrangement of the low-voltage protective switching device connected parallel to the mechanical bypass switch; an electronic control unit; a current measuring arrangement disposed in the outer conductor path, the current measuring arrangement being connected with the electronic control unit; and a first mechanical disconnecting switch disposed in series to the first semiconductor circuit arrangement and in parallel to the mechanical bypass switch. The electronic control controls the mechanical bypass switch.

20 Claims, 2 Drawing Sheets

(51) Int. Cl.
    *H02H 3/08*        (2006.01)
    *H02H 7/22*        (2006.01)

(52) U.S. Cl.
    CPC ....... *H02H 7/222* (2013.01); *H01H 2009/543* (2013.01); *H01H 2009/544* (2013.01)

(56) References Cited

U.S. PATENT DOCUMENTS

| | | |
|---|---|---|
| 2015/0022928 A1 | 1/2015 | Mohaddes Khorassani |
| 2015/0280421 A1* | 10/2015 | Niwa ................ H02H 5/10 361/91.1 |

* cited by examiner

LOW-VOLTAGE CIRCUIT BREAKER DEVICE

CROSS-REFERENCE TO PRIOR APPLICATIONS

This application is a U.S. National Phase application under 35 U.S.C. § 371 of International Application No. PCT/EP2017/074910, filed on Sep. 29, 2017, and claims benefit to German Patent Application No. DE 10 2016 120 070.0, filed on Oct. 21, 2016. The International Application was published in German on Apr. 26, 2018 as WO 2018/072983 under PCT Article 21(2).

FIELD

The invention concerns a low-voltage protective switching device.

BACKGROUND

A similar protective switching device is known from WO 2015/028634 A1 from the applicant. When the protective switching device is switched off, first the bypass switch is opened, wherein an electrical arc results, and the current commutates onto the semiconductor circuit arrangement. Subsequently, the previously switched-on, semiconductor circuit arrangement is switched off and the disconnection contacts for providing the galvanic separation, which are connected in series to the bypass switch, are opened.

These disconnection contacts are necessary in order to prevent current leakage via the semiconductor circuit arrangement in a switched-off state. These disconnection contacts, in switched-on operation, result in a substantial resistance of the switching device concerned and accordingly to a higher power loss and intrinsic heating of the switching device. In addition to the two serial switching contact pairs, the resistance is also increased by means of the required cabling and the corresponding contact points. By means of these resistances, the nominal currents of such switching devices are limited, or this results in an increase in the construction size when high nominal currents are required. Since current flows continuously through the contacts concerned, these must also be of according high-quality design, wherein nevertheless an electrical resistance cannot be avoided at this point. The intrinsic heating in permanent operation ensures a reduced life-span of the semiconductors.

SUMMARY

In an embodiment, the present invention provides a low-voltage protective switching device, comprising: at least one outer conductor path from an outer conductor supply terminal of the low-voltage protective switching device to an outer conductor load terminal of the low-voltage protective switching device; a neutral conductor path from a neutral conductor terminal of the low-voltage protective switching device to a neutral conductor load terminal of the low-voltage protective switching device; a mechanical bypass switch disposed in the outer conductor path; a first semiconductor circuit arrangement of the low-voltage protective switching device connected parallel to the mechanical bypass switch; an electronic control unit; a current measuring arrangement disposed in the outer conductor path, the current measuring arrangement being connected with the electronic control unit; and a first mechanical disconnecting switch disposed in series to the first semiconductor circuit arrangement and in parallel to the mechanical bypass switch, wherein the electronic control unit is configured to control the mechanical bypass switch and the first semiconductor circuit arrangement upon detecting a predeterminable overcurrent by the current measuring arrangement.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides a protective switching device of the initially-mentioned sort with which the mentioned disadvantages can be avoided, which has a low construction size, which enables high nominal or continuous currents, which has a high cut-out capability and has a high degree of reliability over a long time.

Thus, a protective switching device can be formed which has a low internal resistance, as a result of which even in the case of high continuous current load the intrinsic heating of the protective switching device remain low. By means of the low intrinsic heating, also the construction size of the protective switching device can be kept small. By reason of the low intrinsic heating of the protective switching device, the internal temperatures can be kept low, as a result of which the life-span of the semiconductors in the protective switching device and the reliability is increased.

Figure 3:
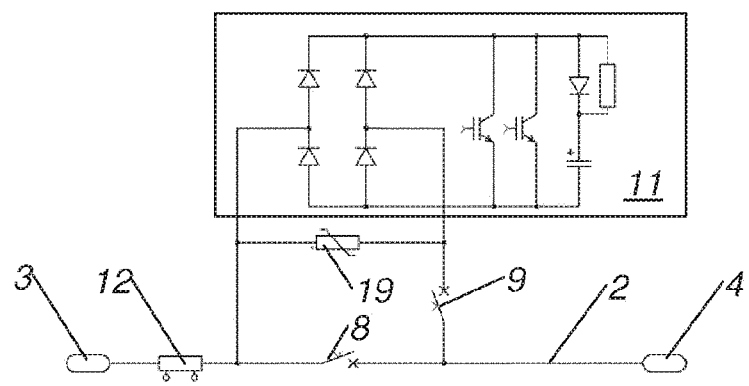
FIG. 3 shows a first embodiment of a switching path of a present protective switching device.
Figure 4:
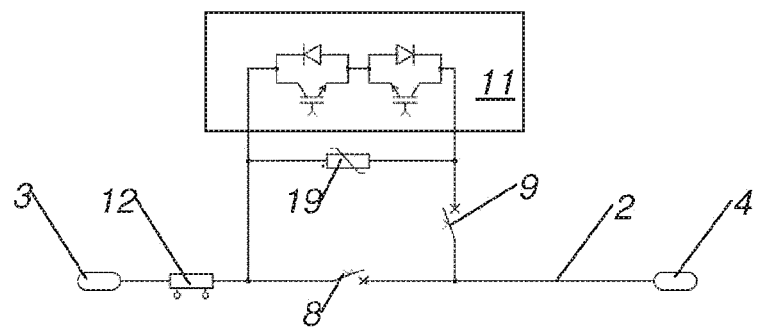
FIG. 4 shows a second embodiment of a switching path of a present protective switching device.
Figure 5:
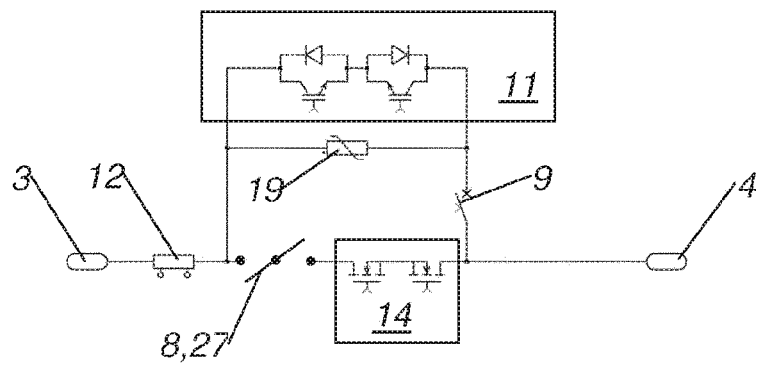
FIG. 5 shows a third embodiment of a switching path of a present protective switching device.

FIGS. 3 to 5 show respectively different embodiments of the outer conductor path of a low-voltage protective switching device 1 having at least one outer conductor path 2 from an outer conductor supply terminal 3 of the low-voltage protective switching device 1 to an outer conductor load terminal 4 of the low-voltage protective switching device 1, and a neutral conductor path 5 from a neutral conductor terminal 6 of the low-voltage protective switching device 1 to a neutral current load terminal 7 of the low-voltage protective switching device 1, wherein in the outer conductor path 2 is disposed a mechanical bypass switch 8, wherein a first semiconductor circuit arrangement 11 of the low-voltage protective switching device 1 is connected in parallel to the bypass switch 8, wherein in the outer conductor path 2 is disposed a current measuring arrangement 12, which is connected with an electronic control unit 13 of the protective switching device 1, wherein the electronic control unit 13 is configured to control the bypass switch 8 and the first semiconductor circuit arrangement 11 at the detection of a predeterminable overcurrent, in particular a short-circuit current, by means of the current measuring arrangement 12, wherein a first mechanical disconnecting switch 9 is disposed or switched in series to the first semiconductor circuit arrangement 11 and in parallel to the bypass switch 8.

Thereby, a low-voltage protective switching device 1 can be formed which has a low inner resistance, as a result of which even when subjected to high continuous current the intrinsic heating of the low-voltage protective switching device 1 remain low. As a result of the low intrinsic heating of the low-voltage protective switching device 1, the interior temperatures can be kept low, as a result of which the life-span of the semiconductors in the low-voltage protective switching device 1 and accordingly the reliability of the low-voltage protective switching device 1 are increased.

In the case of the present low-voltage protective switching device 1, as in the case of the low-voltage protective switching device according to WO 2015/028634 A1, it concerns low-voltage protective switching devices. As low-voltage, as is per se usual, is described the range up to 1000 V AC voltage or 1500 V DC voltage.

Figure 1:
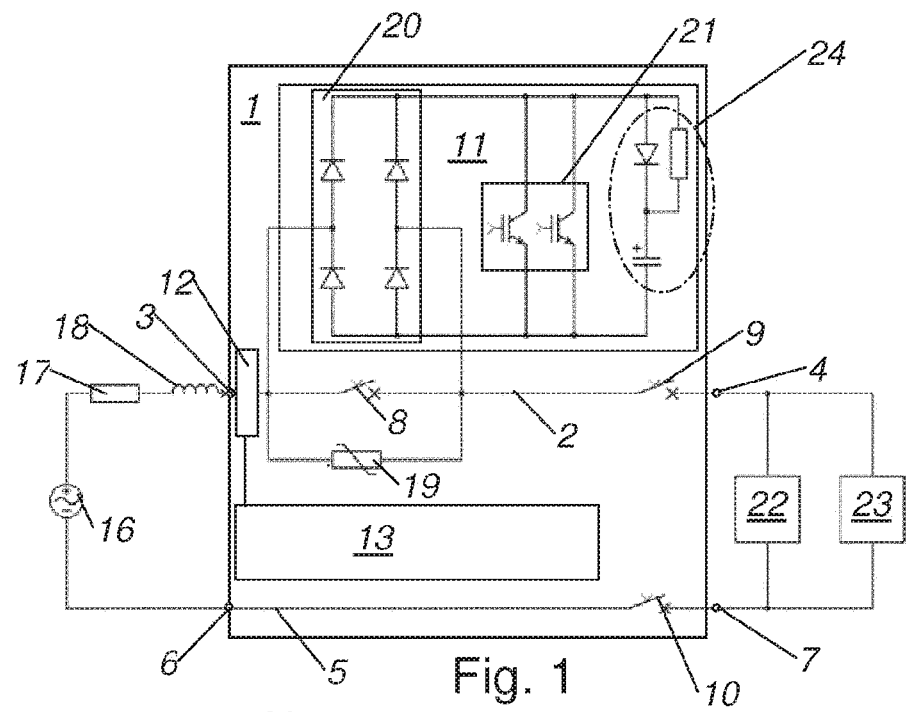
FIG. 1 shows a first protective switching device according to the prior art.

FIG. 1 shows a protective switching device according to the prior art, approximately as it is described in WO 2015/028634 A1. This shows, as does also the protective switching device 1 according to FIG. 2, an outer conductive path 2 and a neutral conductor path 5. The outer conductor path 2 extends through the protective switching device 1 from an outer conductor supply terminal 3 to an outer conductor load terminal 4. The neutral conductor path 5 extends through the protective switching device 1 from a neutral conductor terminal 6 to a neutral conductor load terminal 7. The terminals 3, 4, 6, 7 concerned are respectively in the form of screw connection terminals or plug connection terminals, and disposed in the protective switching device 1 so as to be accessible from the outside.

The protective switching device 1 has preferably an insulating material housing.

In the outer conductor path 2 is disposed a conventional mechanical bypass switch 8 having simple contact breaking. In the case of the switch according to the prior art, as shown, in the outer conductor path 2 is furthermore disposed a first mechanical disconnecting switch 9 in series to the bypass switch 8. In the neutral conductor path 5 is disposed a second mechanical disconnecting switch 10. In parallel to the bypass switch 8 is connected a semiconductor circuit arrangement 11.

Furthermore, parallel to the bypass switch 8 is connected an overvoltage suppressor 19.

The protective switching device 1 has furthermore a current measuring arrangement 12 which is disposed in the outer conductor path 2 and which is preferably configured comprising a shunt resistor.

The current measuring arrangement 12 is connected with an electronic control unit 13 of the protective switching device 1, which is preferably configured comprising a microcontroller or microprocessor. The electronic control unit 13 is configured to control the bypass switch 8 and the first semiconductor circuit arrangement 11, as well as the first mechanical disconnecting switch 9 and the second mechanical disconnecting switch 10, thus to actuate or to switch these in a predeterminable manner. To this end, the electronic control unit 13 is connected, preferably by circuitry, with the first semiconductor circuit arrangement 11, as well as furthermore with, in particular electromagnetic, actuating elements of the mechanical switches, therefore of the bypass switch 8, the first mechanical disconnecting switch 9 and the second mechanical disconnecting switch 10. The appropriate connections starting from the electronic control unit 13 are not shown in FIGS. 1 and 2.

The first semiconductor circuit arrangement 11 has preferably a rectifier circuit 20 which is preferably configured as a full bridge, and, in the case of the present embodiment, two power semiconductors 21 which are presently formed as IGBT, as actual switching or regulating elements. In this regard, also larger power semiconductors 21 can be provided.

Figure 2:
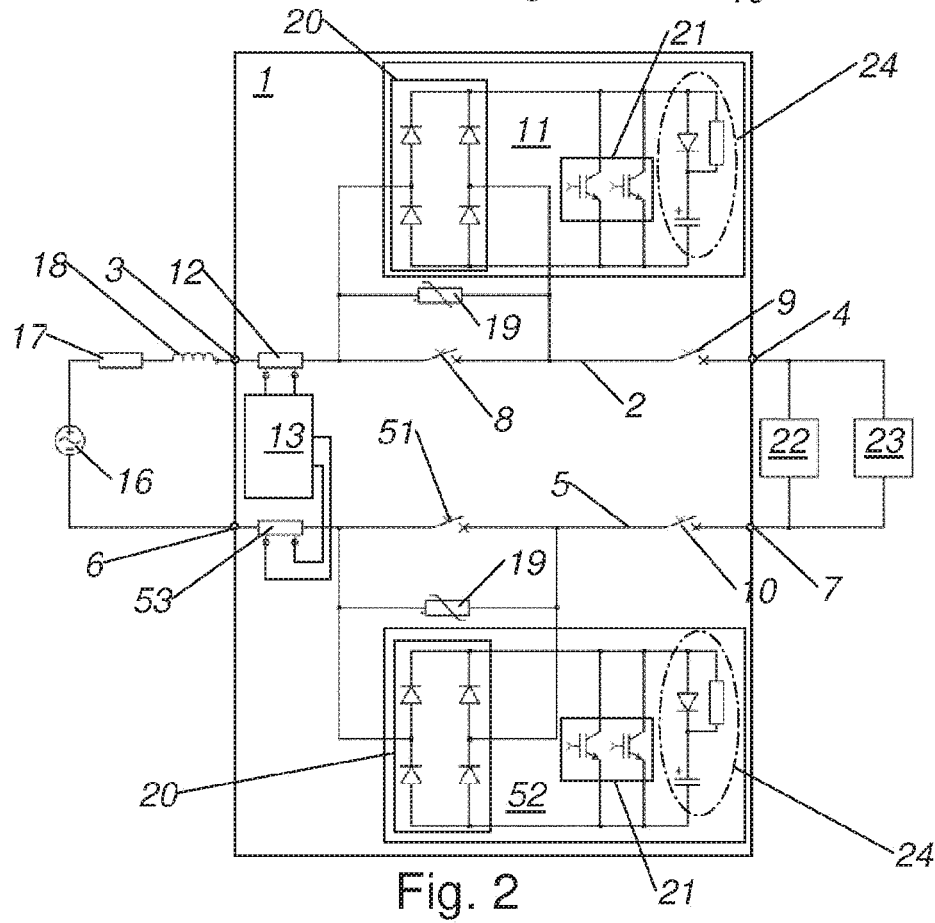
FIG. 2 shows a second protective switching device according to the prior art.

In FIGS. 1 and 2, in addition to the actual protective switching device 1, are implied broad the electrical environment. Here, the supply network is represented by the AC/DC mains voltage source 16, the network internal resistance 17 and the network inductance 18. Furthermore, an electrical load 23 and an electrical fault 22 is shown in the form of a short-circuit.

In a switching device according to the prior art, as shown in FIG. 1, it is provided that a cut-off procedure is carried out by the bypass switch 8 and the first semiconductor circuit arrangement 11, and the first and second disconnecting switches 9, 10 serve only to ensure a galvanic disconnection of the load circuit after successful cut-off.

The low-voltage protective switching device 1 according to FIG. 2 corresponds substantially to the low-voltage protective switching device 1 according to FIG. 1, wherein this is designed to be bipolar. This has a second bypass switch 51, a third semiconductor circuit arrangement 52 and a second current measuring arrangement 53.

A present low-voltage protective switching device 1 corresponds preferably, apart from the differences explained, to a low-voltage protective switching device according to FIG. 1 or 2. In the case of bipolar embodiments of a present low-voltage protective switching device 1, the switch path or circuit connection described as a neutral conductor path 5 is formed or can be formed by the low-voltage protective switching device 1 according to the described outer conductor path 2.

In contrast to the low-voltage protective switching devices 1 according to FIGS. 1 and 2, it is provided in the present low-voltage protective switching devices 1, that the first mechanical disconnecting switch 9 is disposed in circuit in series to the first semiconductor circuit arrangement 11 in the parallel branch of the first semiconductor circuit arrangement 11, thus simultaneously in parallel to the bypass switch 8. Preferred embodiment forms of significant parts of such low-voltage protective switching devices 1 are represented in FIGS. 3, 4 and 5. In this arrangement, the first mechanical disconnecting switch 9 can be mechanically significantly more simply formed than in the case of the low-voltage protective switching devices 1 according to FIG. 1 or 2, since current flows through this only in the course of a switching operation. Simultaneously, the bypass switch 8 is to be configured for the guaranteeing of a galvanic disconnection, in particular having a correspondingly increased contact distance in the opened condition.

It is preferably provided that the electronic control unit 13 is furthermore configured to actuate the first mechanical disconnecting switch 9.

In the same way it is preferably provided that in the neutral conductor path 5 is disposed a second mechanical disconnecting switch 10, and that the electronic control unit 13 is preferably configured to actuate the second mechanical disconnecting switch 10. Furthermore, preferably an overvoltage suppressor 19, in particular a varistor, preferably an MOV, is disposed in circuit in parallel to the bypass switch 8 and to the first semiconductor circuit arrangement 11 and also in series to the first disconnecting switch 9. Here, MOV stands for metal oxide varistor.

The embodiments according to FIGS. 3 and 4 differ only with respect to the configuration of the first semiconductor circuit arrangement 11. The present arrangement according to the invention of the first disconnecting switch 9 is thus possible with differently configured first semiconductor circuit arrangements 11.

In a present low-voltage protective switching device 1 it is preferably provided that the bypass switch 8 is in the form of a switch 27 having multiple breaks. The reference sign 27 refers here to the switch having multiple breaks, which fulfils the function of the bypass switch 8. Furthermore, it is preferably provided that in the outer conductor path 2 is disposed in circuit a second semiconductor circuit arrangement 14 in series to the bypass switch 8 and in parallel to the first semiconductor circuit arrangement 11. In this regard, also the overvoltage suppressor 19 is wired in parallel to the bypass switch 8 and the second semiconductor circuit arrangement 14. The second semiconductor circuit arrangement 14 is in the same way controlled by the electronic control unit 13.

By means of the multiple breaks in the case of the bypass switch 8, a contact distance required for the cut-off of a short-circuit can be more quickly achieved. By means of the multiple breaks, the volume and the mass of the bypass switch 8 can be reduced. Thus, the mass inertia of the moving parts and the contact opening time can be reduced. By means of the reduction in the contact opening time, the required safe contact distance can be achieved more quickly, in order to enable a cut-off of a short-circuit current through the power semiconductor 21 of the first semiconductor circuit arrangement 11. Thus, the load of the first semiconductor circuit arrangement 11 can be reduced, which during the time, which the bypass switch 8 requires to reach the safe contact distance, in order to prevent a renewed ignition of the electrical arc at the contacts of the bypass switch 8, are exposed to a very high load. By means of the quicker attaining of this safe distance of the contact of the bypass switch 8, furthermore, in the first semiconductor circuit arrangement 11, power semiconductors 20, 21 can be used with lower maximum loading capability. Power semiconductors 20, 21 of this sort have both a lesser internal resistance and a lesser physical overall size, than power semiconductors 20, 21 which have a higher loading capability. By means of the smaller overall size, in particular the shorter paths within the power semiconductor 21, the relevant loop inductance of the low-voltage protective switching device 1 can be reduced, as a direct result of which furthermore the commutation time of the short circuit current onto the first semiconductor circuit arrangement 11 can be reduced. By means of the lower internal resistance, the commutation time is further reduced.

Admittedly, it has been shown that in real versions of the bypass switch 8 having multiple breaks the contacts never open absolutely precisely at the same time. In observation time with very fine temporal resolution, it was able to be determined that as a rule one of the contact pairs out of movable and preferably housing-fixed contact carries out the opening or disconnecting procedure before the at least one further contact pair. As a result, during this time duration, the entire building or increasing short-circuit current has to be borne by only one contact pair, which is however not configured to do this. This results not only in a high load for this contact pair but also furthermore to a deterioration or increase in commutation time and as a result also to an increase in the load on the power semiconductors 20, 21 of the first semiconductor circuit arrangement 11.

By means of the second semiconductor circuit arrangement 14, both the load on the bypass switch 8 and also on the first semiconductor circuit arrangement 11 can be reduced. Thereby it can be achieved that the current commutates onto the first semiconductor circuit arrangement 11 at significantly lower current strength then in the case of conventional protective switching devices according to FIG. 1, as a result of which the load on the first semiconductor switching device 11 is reduced and its life-span can be increased. As a result, the differences regarding the temporal opening of the contacts of the bypass switch 8 constitute no problem. Thus, the occurrence of an electrical arc at the bypass switch 8 can be substantially entirely avoided, as a result of which the load on the corresponding switch contacts is reduced and their life-span can be increased. Thus, the advantages of the multiple breaks at the bypass switch 8 can be exploited without a negative influence caused by its peculiarities.

By means of the present measures, further advantages can be achieved. Since no electrical arc occurs at cut-off, also no electrical arc needs to be extinguished. There result no hot ionised gases which would first need to be cooled in order to prevent a renewed ignition of an electrical arc. In this manner, both the durability of the first semiconductor circuit arrangement 11 can be reduced, and also the entire cut-off procedure can be further accelerated, since a renewed ignition of an electrical arc in the present case is no longer to be feared. Alternatively, also the durability of the first semiconductor circuit arrangement 11 can remain unchanged and the opening speed of the bypass switch 8 can be reduced, as a result of which this can be configured more simply.

By means of the fast cut-off of a short-circuit or overload current, less energy is stored than otherwise in the form of leakage inductances or in the network inductance, as a result of which the overvoltage suppressor 19 and the snubber 24 are preserved. This can also be dimensioned smaller by reason of further effects.

Since no switching arc occurs, the voltage drop at the first semiconductor circuit arrangement 11 is not limited by the electrical arc voltage.

The switch 27 with multiple breaks has at least one double break, wherein it is preferably provided that the switch 27 having multiple breaks is configured having at least one movable switch bridge having at least one first and at least one second movable contact. The switch 27 is shown schematically in FIG. 5. In this regard, it can furthermore also be provided that the switch 27 having multiple breaks also has a triple break, a quadruple break or a quintuple break. Switches 27 having multiple breaks and movable switch bridges are known per se, for which reason they will not be discussed in more detail with regard to the present matter.

The electronic control unit 13 is provided or configured to control the bypass switch 8, the first mechanical disconnecting switch 9, the second mechanical disconnecting switch 10, the first semiconductor circuit arrangement 11 and the second semiconductor circuit arrangement 14 when a predeterminable overcurrent, in particular a short-circuit current, is detected by the current measuring arrangement 12, in order to cause a cut-off of the protective switching device 1. In this regard it is preferably provided that the electronic control unit 13 is configured, at a detection of a short-circuit current by the current measuring arrangement 12, to first switch on the first semiconductor circuit arrangement 11, substantially immediately subsequently to disable the second semiconductor circuit arrangement 14, substantially immediately following to open the bypass switch 8, subsequently, in particular as sooners the bypass switch 8 has opened sufficiently, to steer the first semiconductor circuit arrangement 11 into the non-conducting state, and subsequently, in particular as soon the current is virtually null, to open the first mechanical disconnecting switch 9. Subsequently, preferably the second mechanical disconnecting switch 10 is opened. By constructing the operation in this sequence, it can be achieved that the current commutates onto the first semiconductor circuit arrangement 11 when said current is still very small, wherein no corresponding drop, connected with an electrical arc at the bypass switch 8, is necessary. The multiple contacts of the bypass switch 8 open already in the current list state, for which reason no electrical arc occurs, and the different contact opening causes no problems.

After the cut-off of the IGBTs 21, the voltage will increase because of the energy stored in the network. The increasing voltage is led from the overvoltage suppressor 19 which limits the current. When the current is small enough, the first and second mechanical disconnecting switches 9, 10 are opened.

It is preferably provided that the second semiconductor circuit arrangement 14 is formed bidirectionally. Especially preferably, the second semiconductor switch arrangement 14 is formed as four quadrant switch, for both current directions and both voltage polarities.

Furthermore, it is preferably provided that the second semiconductor circuit arrangement 14 is configured comprising low-voltage MOSFETs 15. The second semiconductor circuit arrangement 14 is continuously in current flow, as a result of which the inner resistance thereof is relevant in order to avoid a power loss at this point which is too high. After the cut-off of the second semiconductor circuit arrangement 14, the current commutates onto the first semiconductor circuit arrangement 11. The voltage drop across the second semiconductor circuit arrangement 14 is in this regard only a few volts. At the switching-off of the first semiconductor circuit arrangement 11, care must be taken that the switch contacts of the bypass switch 8, 27 have already achieved sufficient contact distance such that there is no longer any voltage applied to the second semiconductor circuit arrangement 14.

Preferably, the low-voltage MOSFETs 15 are selected as 20-30 V MOSFETs, for reason of their very low inner resistance, as well as in order to keep the loss line low in regular operation. The voltage drop at the low-voltage MOSFETs 15 serves only to cause the currents to commutate onto the first semiconductor circuit arrangement 11.

By reason of the "intrinsic body diode" and operation of the MOSFETs in the third quadrant, only two such low-voltage MOSFETs 15 are required for a bidirectional switch. By means of the high conductivity, high currents can be achieved at low gate voltages.

The first semiconductor circuit arrangement 11 is designed to be correspondingly robust, in order to switch the high currents and voltage peaks in the case of a short-circuit. The first semiconductor circuit arrangement 11 can be switched off as soon the contacts of the bypass switch 8, 27 have sufficient contact distance.

The MOSFETs 15 have respectively preferably an antiparallel diode which is also described as a monolithic body diode.

When switching-on a switched-off low-voltage protective switching device 1, this can have previously been switched-off by reason of a short-circuit cut-off, such that the contacts of the bypass switch 8 are open. In this regard, the electrical fault concerned can still be present. When closing the switch contacts of the bypass switch 8, there results as a rule a so-called rebounding of the contacts. Here, in each case for a short time a conducting connection is produced and then disconnected until a mechanically stable state is achieved. In particular in the case of an existing short-circuit, this results in a high load on the contacts. Furthermore, in particular when switching-on the low-voltage protective switching device 1, in the case of an existing short-circuit, there is a risk of damaging the second semiconductor circuit arrangement 14.

Preferably, therefore, it is provided that the electronic control unit 13 is configured, when switching on the switched-off low-voltage protective switching device 1, with open and bypass switch 8 and disabled first and second semiconductor circuit arrangement 11, 14, preferably first to close the second mechanical disconnecting switch 10, subsequently to close the first mechanical disconnecting switch 9, in the case of AC current in particular in the case of a zero crossing of the network voltage, subsequently after at least one predeterminable first time duration to switch-on the first semiconductor circuit arrangement 11, substantially immediately subsequently to close the bypass switch 8, after a predeterminable second time duration, in the case of AC current in particular at the next zero crossing of the network voltage, to switch on the second semiconductor circuit arrangement 14 and substantially directly subsequently to switch-off the first semiconductor circuit arrangement 11 and to keep the first mechanical disconnecting switch 9 closed.

Furthermore, it is preferably provided that the electronic control device 13 is configured, when switching off the switched-on low-voltage protective switching device 1 having a closed first mechanical disconnecting switch 9 first to switch on the first semiconductor circuit arrangement 11, subsequently to switch off the second semiconductor circuit arrangement 14, subsequently to open the bypass switch 8 and to cut off the first semiconductor circuit arrangement 11 and subsequently, in particular as soon as it has been detected that the current via the first disconnecting switch 9 has sunk to virtually null, to open the first mechanical disconnecting switch 9.

The first time duration is in this regard of a length such that switch contacts of the first mechanical disconnecting switch 9, as well as preferably switch contacts of the second mechanical disconnecting switch 10, have reached a mechanically stationary state. When switching on a DC current it is sufficient to wait for this time.

For switching on an AC current it is preferably provided that the electronic control unit 13 is configured, after the expiry of the first time duration to switch on the second semiconductor circuit arrangement 14 at the next zero crossing of the applied voltage. For the detection of the zero crossing of the applied voltage, the low-voltage protective switching device 1 has a voltage measurement arrangement 29 which is connected with the control unit 13.

The second time duration is of a length such that switch contacts of the bypass switch 8 have reached a mechanically stationary state.

By means of the aforementioned measures, the low-voltage protective switching device 1 can be switched on without exposing the individual components to excessive loads.

By means of the present measures, there results as a further advantage that in the case of a switching operation when there is a fault in the first semiconductor circuit arrangement 11, no fire results in the low-voltage protective switching device 1. In the case of a low-voltage protective switching device 1 according to FIG. 1, in this case the bypass switch 8 would open, as a result of which the resulting electrical arc would result in a fire in the bypass switch 8 and as a result in the entire low-voltage protective switching device 1. In the present low-voltage protective switching device 1 according to FIG. 2, this is not the case. By reason of an avalanche or lavine breakdown in the MOSFET(s) 15, the bypass switch 8, 27 opens further without an electrical arc, such that a fire can be avoided. Since it can in this case result in a destruction of the second semiconductor circuit arrangement 14, the second semiconductor circuit arrangement 14 is preferably disposed encapsulated in a protective housing, in particular a metal housing, within the low-voltage protective switching device 1.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A low-voltage protective switching device, comprising:
   at least one outer conductor path from an outer conductor supply terminal of the low-voltage protective switching device to an outer conductor load terminal of the low-voltage protective switching device;
   a neutral conductor path from a neutral conductor terminal of the low-voltage protective switching device to a neutral conductor load terminal of the low-voltage protective switching device;
   a mechanical bypass switch in a first branch of the outer conductor path;
   a first semiconductor circuit arrangement of the low-voltage protective switching device, the first semiconductor circuit arrangement being in a second branch of the outer conductor path, the second branch being parallel to the first branch comprising the mechanical bypass switch;
   an electronic control unit;
   a current measuring arrangement in the outer conductor path, the current measuring arrangement being connected with the electronic control unit; and
   a first mechanical disconnecting switch in the second branch of the outer conductor path in series with the first semiconductor circuit arrangement, such that the first mechanical disconnecting switch is a circuit parallel to the mechanical bypass switch,
   wherein the electronic control unit is configured to control the mechanical bypass switch and the first semiconductor circuit arrangement upon detecting a predeterminable overcurrent by the current measuring arrangement.

2. The low-voltage protective switching device according to claim 1, wherein the electronic control unit is configured to actuate the first mechanical disconnecting switch.

3. The low-voltage protective switching device according to claim 1, further comprising a second mechanical disconnecting switch disposed in the neutral conductor path.

4. The low-voltage protective switching device according to claim 3, wherein the electronic control unit is configured to actuate the second mechanical disconnecting switch.

5. The low-voltage protective switching device according to claim 1, further comprising an overvoltage suppressor disposed in circuit in parallel to the mechanical bypass switch and to the first semiconductor circuit arrangement and in series to the first disconnecting switch.

6. The low-voltage protective switching device according to claim 5, wherein the overvoltage suppressor comprises a MOS-varistor.

7. The low-voltage protective switching device according to claim 1, wherein the mechanical bypass switch comprises a switch having multiple breaks.

8. The low-voltage protective switching device according to claim 7, wherein the switch having multiple breaks is configured comprising at least one movable switching bridge having at least one first and at least one second movable contact.

9. The low-voltage protective switching device according to claim 1, wherein in the outer conductor path is disposed a second semiconductor circuit arrangement circuit-technically in series to the mechanical bypass switch and in parallel to the first semiconductor circuit arrangement.

10. The low-voltage protective switching device according to claim 9, wherein the second semiconductor circuit arrangement is configured bidirectionally.

11. The low-voltage protective switching device according to claim 10, wherein the second semiconductor circuit arrangement comprises a bidirectional 4-quadrant switch.

12. The low-voltage protective switching device according to claim 9, wherein the second semiconductor circuit arrangement comprises low-voltage MOSFETs.

13. The low-voltage protective switching device according to claim 9, wherein the electronic control unit is configured, upon detecting a short-circuit current and/or overload current on a part of the current measuring arrangement, to first switch on the first semiconductor circuit arrangement, subsequently to disable the second semiconductor circuit arrangement, following to open the mechanical bypass switch, subsequently to regulate the first semiconductor circuit arrangement into the non-conducting state, and subsequently to open the first mechanical disconnecting switch.

14. The low-voltage protective switching device according to claim 9, wherein the electronic control unit is configured, when the switched-off low-voltage protective switching device is switched-on, when the mechanical bypass switch is opened, and when the first and second semiconductor circuit arrangements are disabled, first to close the first mechanical disconnecting switch, subsequently after at least a predeterminable first time duration to switch-on the first semiconductor circuit arrangement, substantially directly thereafter to close the mechanical bypass switch, after a predeterminable second time duration to switch-on the second semiconductor circuit arrangement, and substantially directly thereafter to switch-off the first semiconductor circuit arrangement and to keep closed the first mechanical disconnecting switch.

15. The low-voltage protective switching device according to claim 14, wherein the first time duration is of a length such that switch contacts of the first mechanical disconnecting switch have reached a mechanically stationary state.

16. The low-voltage protective switching device according to claim 15, wherein the first time duration is of a length such that switch contacts of the second mechanical disconnecting switch have reached a mechanically stationary state.

17. The low-voltage protective switching device according to claim 14, wherein the electronic control unit is configured, at a switching-on of an AC current after an expiry of the first time duration, to switch-on the second semiconductor circuit arrangement at a next zero crossing of an applied voltage.

18. The low-voltage protective switching device according to claim 14, wherein the second time duration is of a length such that switch contacts of the mechanical bypass switch have reached a mechanically stationary state.

19. The low-voltage protective switching device according to claim 9, wherein the electronic control unit is configured, when the switched-on low-voltage protective switching device is switched off with closed first mechanical disconnecting switch first to switch on the first semiconductor circuit arrangement, subsequently to switch off the second semiconductor circuit arrangement, subsequently to open the mechanical bypass switch and to cut off the first semiconductor circuit arrangement, and subsequently to open the first mechanical disconnecting switch.

20. The low-voltage protective switching device according to claim 1, wherein the predeterminable overcurrent comprises a short-circuit current.

* * * * *